United States Patent
Tang et al.

(10) Patent No.: US 12,238,335 B2
(45) Date of Patent: Feb. 25, 2025

(54) EFFICIENT SUB-PIXEL MOTION VECTOR SEARCH FOR HIGH-PERFORMANCE VIDEO ENCODING

(71) Applicant: NVIDIA Corporation, Santa Clara, CA (US)

(72) Inventors: Yongmao Tang, Shanghai (CN); Jianjun Chen, Shanghai (CN); Junan Chen, Jiangsu (CN); Yonghai Wu, Shanghai (CN); Zejun Hu, Jiangsu (CN); Wei Feng, Shanghai (CN)

(73) Assignee: NVIDIA Corporation, Santa Clara, CA (US)

( * ) Notice: Subject to any disclaimer, the term of this patent is extended or adjusted under 35 U.S.C. 154(b) by 51 days.

(21) Appl. No.: 18/302,625

(22) Filed: Apr. 18, 2023

(65) Prior Publication Data

US 2024/0357175 A1    Oct. 24, 2024

(51) Int. Cl.
*H04N 19/139*    (2014.01)
*H04N 19/105*    (2014.01)
(Continued)

(52) U.S. Cl.
CPC ........... *H04N 19/61* (2014.11); *H04N 19/105* (2014.11); *H04N 19/109* (2014.11);
(Continued)

(58) Field of Classification Search
CPC .. H04N 19/105; H04N 19/109; H04N 19/139; H04N 19/176
See application file for complete search history.

(56) References Cited

U.S. PATENT DOCUMENTS 8,311,111 B2    11/2012  Xu et al.
9,432,668 B1    8/2016   Bossen et al.
(Continued)

FOREIGN PATENT DOCUMENTS

CN    108449603 A    8/2018
CN    111918058 A    11/2020
(Continued)

OTHER PUBLICATIONS

Chen Y., et al., "An Overview of Core Coding Tools in AV1 Video Codec," Picture Coding Symposium (PCS), Jun. 24-27, 2018, 5 Pages, DOI: 10.1109/PCS.2018.8456249.
(Continued)

*Primary Examiner* — Kyle M Lotfi
(74) *Attorney, Agent, or Firm* — Lowenstein Sandler LLP (57) ABSTRACT

Disclosed are systems and techniques for efficient real-time codec encoding of video files. In one embodiment, the techniques include obtaining a first plurality of motion vectors of a first resolution, generating a second plurality of motion vectors of a second resolution, and calculating a first cost of the motion vector using a first cost function of a first size. The techniques include selecting a subset of motion vectors of the second plurality of motion vectors, calculating a second cost using a second cost function of a second size, and generating a plurality of combined motion vectors based on the subset of motion vectors. The techniques include calculating a third cost using the second cost function of the second size, selecting a final motion vector, and generating, based on the selected final motion vector, a block of predicted pixels that approximates a block of source pixels of an image frame.

20 Claims, 6 Drawing Sheets

(51) Int. Cl.

| | |
|---|---|
| *H04N 19/109* | (2014.01) |
| *H04N 19/122* | (2014.01) |
| *H04N 19/156* | (2014.01) |
| *H04N 19/172* | (2014.01) |
| *H04N 19/176* | (2014.01) |
| *H04N 19/182* | (2014.01) |
| *H04N 19/423* | (2014.01) |
| *H04N 19/61* | (2014.01) |

(52) U.S. Cl.
CPC ......... *H04N 19/122* (2014.11); *H04N 19/139* (2014.11); *H04N 19/156* (2014.11); *H04N 19/172* (2014.11); *H04N 19/176* (2014.11); *H04N 19/182* (2014.11); *H04N 19/423* (2014.11)

(56) References Cited

U.S. PATENT DOCUMENTS

| | | | |
|---|---|---|---|
| 9,998,726 | B2 | 6/2018 | Rusanovskyy et al. |
| 10,070,128 | B2 | 9/2018 | Ugur et al. |
| 10,091,514 | B1 | 10/2018 | Bossen et al. |
| 10,621,731 | B1 | 4/2020 | Duenas et al. |
| 10,687,054 | B2 | 6/2020 | Mahdi et al. |
| 10,887,611 | B2 | 1/2021 | Seregin et al. |
| 10,999,594 | B2 | 5/2021 | Hsieh et al. |
| 11,017,566 | B1 | 5/2021 | Tourapis et al. |
| 11,057,636 | B2 | 7/2021 | Huang et al. |
| 11,070,813 | B2 | 7/2021 | Socek et al. |
| 11,172,195 | B2 | 11/2021 | Seregin |
| 11,197,009 | B2 | 12/2021 | Zhang et al. |
| 11,202,070 | B2 | 12/2021 | Zhang et al. |
| 11,218,694 | B2 | 1/2022 | Seregin et al. |
| 11,272,201 | B2 | 3/2022 | Seregin et al. |
| 11,317,111 | B2 | 4/2022 | Rusanovskyy et al. |
| 11,343,504 | B2 | 5/2022 | Zhao et al. |
| 11,368,684 | B2 | 6/2022 | Seregin et al. |
| 11,388,394 | B2 | 7/2022 | Seregin et al. |
| 11,496,746 | B2 | 11/2022 | Siddaramanna et al. |
| 11,563,933 | B2 | 1/2023 | Seregin et al. |
| 11,582,475 | B2 | 2/2023 | Rusanovskyy et al. |
| 11,638,025 | B2 | 4/2023 | Pourreza et al. |
| 11,638,062 | B2 | 4/2023 | Stockhammer et al. |
| 11,677,987 | B2 | 6/2023 | Said |
| 2010/0118945 | A1 | 5/2010 | Wada et al. |
| 2013/0016783 | A1 | 1/2013 | Kim et al. |
| 2013/0101035 | A1 | 4/2013 | Wang et al. |
| 2013/0259142 | A1 | 10/2013 | Ikeda et al. |
| 2014/0198844 | A1 | 7/2014 | Hsu et al. |
| 2015/0229921 | A1 | 8/2015 | Chen et al. |
| 2016/0225161 | A1* | 8/2016 | Hepper .................. H04N 5/145 |
| 2016/0330445 | A1 | 11/2016 | Ugur et al. |
| 2017/0085886 | A1 | 3/2017 | Jacobson et al. |
| 2017/0142438 | A1* | 5/2017 | Hepper ................ H04N 19/117 |
| 2017/0201769 | A1 | 7/2017 | Chon et al. |
| 2017/0272758 | A1 | 9/2017 | Lin et al. |
| 2020/0021847 | A1 | 1/2020 | Kim et al. |
| 2020/0029096 | A1 | 1/2020 | Rusanovskyy |
| 2020/0099926 | A1 | 3/2020 | Tanner et al. |
| 2020/0104976 | A1 | 4/2020 | Mammou et al. |
| 2020/0105024 | A1 | 4/2020 | Mammou et al. |
| 2020/0111237 | A1 | 4/2020 | Tourapis et al. |
| 2020/0137415 | A1* | 4/2020 | Esenlik ................ H04N 19/521 |
| 2020/0204829 | A1 | 6/2020 | Stepin et al. |
| 2020/0288122 | A1 | 9/2020 | Kim |
| 2020/0359022 | A1 | 11/2020 | Abe et al. |
| 2020/0382777 | A1 | 12/2020 | Zhang et al. |
| 2020/0382804 | A1 | 12/2020 | Zhang et al. |
| 2021/0006833 | A1 | 1/2021 | Tourapis et al. |
| 2021/0021809 | A1 | 1/2021 | Kim |
| 2021/0099701 | A1 | 4/2021 | Tourapis et al. |
| 2021/0211661 | A1 | 7/2021 | Toma et al. |
| 2021/0211703 | A1 | 7/2021 | Kim et al. |
| 2021/0211724 | A1 | 7/2021 | Kim et al. |
| 2021/0217203 | A1 | 7/2021 | Kim et al. |
| 2021/0321093 | A1 | 10/2021 | Sundaram et al. |
| 2021/0377868 | A1 | 12/2021 | Anand |
| 2021/0392334 | A1 | 12/2021 | Esenlik et al. |
| 2022/0021891 | A1 | 1/2022 | Chaudhari et al. |
| 2022/0256169 | A1 | 8/2022 | Siddaramanna et al. |
| 2022/0277164 | A1 | 9/2022 | Malayath |
| 2022/0279204 | A1 | 9/2022 | Malayath et al. |
| 2023/0063062 | A1 | 3/2023 | Srinivasan et al. |
| 2023/0071018 | A1 | 3/2023 | Tang et al. |

FOREIGN PATENT DOCUMENTS

| | | |
|---|---|---|
| CN | 113301347 A | 8/2021 |
| JP | 2014127891 A | 7/2014 |
| WO | 2010030752 A2 | 3/2010 |
| WO | 2012030752 A2 | 3/2012 |
| WO | 2013067903 A1 | 5/2013 |
| WO | 2019163794 A1 | 8/2019 |

OTHER PUBLICATIONS

Goebel et al., "Hardware Design of DC/CFL Intra-Prediction Decoder for AV1 Codec," 32nd Symposium of Integrated Circuits and Systems Design (SBCCI), Sao Paulo, Brazil, Aug. 26-30, 2019, pp. 1-6.

Han J., et al., "A Technical Overview of AV1," arXiv:2008.06091v2 [eess.IV], Feb. 8, 2021, 25 Pages.

International Search Report and Written Opinion for International Application No. PCT/CN2021/116311, mailed May 31, 2022, 6 Pages.

International Search Report and Written Opinion for International Application No. PCT/CN2021/116312, mailed May 26, 2022, 9 Pages.

International Search Report and Written Opinion for International Application No. PCT/CN2021/116711, mailed Apr. 24, 2022, 7 Pages.

Final Office Action for U.S. Appl. No. 17/451,974, mailed Jan. 25, 2024, 13 Pages.

ITU-T; H.265 (Year: 2016).

ITU-T; H.266 (Year: 2020).

Non-Final Office Action for U.S. Appl. No. 17/451,972, mailed Dec. 28, 2023, 51 Pages.

\* cited by examiner

EFFICIENT SUB-PIXEL MOTION VECTOR SEARCH FOR HIGH-PERFORMANCE VIDEO ENCODING

TECHNICAL FIELD

At least one embodiment pertains to computational technologies used to perform and facilitate efficient compression of video files. For example, at least one embodiment pertains to operations that optimize calculation of a motion vector for an inter-frame prediction of a video frame.

BACKGROUND

A video file in a raw (source) pixel format can occupy a very large memory space and require a large network bandwidth for transmission, which can be impractical for storage and/or livestreaming. For example, a typical high-definition video displays about 30 frames per second with frames that are typically rather similar to each other. A lot of information in such frames is necessarily redundant, allowing efficient compression. On the one hand, relatively minor changes occur between many subsequent frames (temporal redundancy). On the other hand, various regions in a given frame are often similar to each other (spatial redundancy), e.g., an image of the sky can extend over a large portion of a frame. As a result, in lieu of transmitting the actual pixel information (luminance and chromaticity) of each pixel, a codec can identify a reference block that is similar to the block being encoded ("predicted") and provide to a decoder a suitable and compact mathematical representation of the difference ("delta") between the actual source block and the predicted block. The reference block can be a block of a different (e.g., previous, or even subsequent) frame, a block of the same frame, or even a synthetic block generated according to some predetermined scheme (mode) based on a small number of reference pixels. Subsequently, instead of storing or livestreaming the actual frame of pixels, the codec can output a bit stream of encoded data, which largely contains instructions to the decoder about how to generate an approximation of the frame whose visual appearance is indistinguishable from or very similar to the source frame.

DETAILED DESCRIPTION

High-performance codecs, such as H.264 (Advanced Video Coding or AVC), H.265 (High Efficiency Video Coding or HEVC), and VP9, allow efficient encoding that is based on finding similar blocks in the same frame (referred to as intra-frame prediction) and/or different frames (referred to as inter-frame prediction). Finding intra-frame prediction blocks can be performed along multiple spatial directions (e.g., 8 directions in AVC and 33 directions in HEVC). Likewise, finding inter-frame prediction blocks can be performed with sub-pixel accuracy, in which a vector of translation (rotation, affine transformation, etc.), referred to herein as a motion vector, specifies the relative displacement of similar blocks in different frames. Blocks of multiple sizes can be processed to identify best predictions, such as (in HEVC) 64×64 pixel blocks, 32×32 pixel blocks, and 16×16 pixel blocks. Multiple block sizes allow for more efficient encoding (of larger portions of the image(s) that are similar to each other) and finer resolution of the portions of the image(s) that contain unique details. VP9 standard allows for an even greater variety of block sizes, including square blocks of 8×8, rectangular blocks of 64×32, 32×64, 32×16, 16×32, 16×8, and 8×16 pixels. Newer codec standards, such as AOMedia Video 1 (AV1), allow even more prediction options. For example, AV1, while inheriting block sizes from VP9, allows for 58 spatial directions for intra-frame predictions. Additionally, AV1 expands on the types of mathematical transforms that can be used to encode residual blocks and numbers and types of filters that can be used to alleviate block boundary artifacts, noise artifacts, motion vector artifacts, and so on.

A conventional AV1 (or other codecs) encoding software can process various superblocks (e.g., 64×64 or 128×128 pixel blocks) sequentially. For example, starting from the top-left superblock 64×64 of a current frame, the software can partition the superblock into all possible (recognized by the codec standard) partitions. A given partition of the superblock can include blocks of multiple sizes. For example, the top-left quadrant of the superblock can be represented by a single 32×32 block, the top-right quadrant can be partitioned into 16 blocks of 8×8 pixels each, the bottom-left quadrant can be partitioned into 2 blocks of 32×16 pixels, and the bottom-right quadrant can be partitioned into 8 blocks of 16×8 pixels. Numerous other partition schemes are also possible. Each block (regardless of the size) in the selected partition scheme can then be approximated (predicted) using inter-frame predictions as well as intra-frame predictions.

During the inter-frame predictions, a block that is the most similar to the current block can be identified in one or more reference frames (previous frames and/or subsequent frames). Closely spaced (in time) frames are likely to be similar to each other (unless a complete change of scenery occurs), with various objects experiencing rather small displacements. As a result, it is often sufficient to explore, in the reference frame(s), a relatively close neighborhood of the current block. The best inter-frame prediction candidate can be selected by minimizing an error value of a cost function that characterizes a difference between the pixels of the inter-frame prediction candidate block and source pixels of the current block.

During the intra-frame predictions, the same block may be approximated based on reference pixels for the block. Typically, reference pixels are boundary pixels of the adjacent blocks (e.g., pixels that are near the top and left boundaries of the current block). Pixels of the current block are inferred from the reference pixels by extrapolation (e.g., from the top row or the left column of reference pixels) or interpolation (from both the top row and the left column) along various directions recognized by the codec standard.

Extrapolation or interpolation of pixels of the current block is performed according to specific formulas that depend on the direction (mode) and are defined as part of the codec standard. Similarly to the inter-frame predictions, the best intra-frame prediction candidate(s) can be selected by minimizing the error value of the cost function and based on how well various intra-frame prediction candidates approximate the source pixels of the current block.

The best inter-frame prediction candidate block and the best intra-frame prediction candidate block (generated using the respective winning intra-frame prediction mode) may be then compared to each other, and a final winner candidate block may be selected. The obtained final winner block, generally, has pixels that are different from the source pixels of the current block. The pixel values of the predicted block subtracted from the source block constitute a residual block. Even though the residual block likely has variations of pixel values that are distributed over the entire area of the block, such variations are usually smooth. This means that a discrete Fourier transform (or some other discrete transform) has coefficients $C_{jk}$ that are concentrated near a long-wavelength end of the transform (e.g., smaller indices j and k). The short-wavelength end of the transform (higher indices j and k) is much less likely to be perceived by a human eye and can be truncated (using what is known as a quantization transform), resulting in a much lower number of (Fourier) coefficients needed to encode the residual block. Such coefficients constitute a basis (subject to additional filtering and entropy encoding) of the encoded codec bitstream.

To make an accurate inter-frame prediction, a motion vector (MV) may be calculated for a given block. The MV may represent a transformation that can be performed (e.g., to a reference block corresponding to the given block) to estimate the source pixels of the given block. A motion estimation component may explore, in the reference frame, a relatively close neighborhood of the current block to determine one (or more) integer-resolution MVs ("integer MVs") that, when applied to a reference block, approximate the source pixels of the current block. In order to improve the approximation, one or more sub-pixel-resolution MVs ("sub-pixel MVs") may be evaluated around the integer MV(s). Each MV may have an associated cost. The cost may be calculated by generating prediction pixels and comparing the prediction pixels to the source pixels using a cost function (e.g., sum of squared error (SSE), sum of absolute difference (SAD), sum of absolute Hadamard-transformed difference (SATD), etc.). To generate prediction pixels for a given MV, the reference block may be transformed according to the MV. The transformed reference block may then be compared to the current block in the source frame.

To further improve the approximation of the source pixels of the current block, one or more combined MVs may be evaluated. The predicted pixels of a combined MV are generated by combining (e.g., averaging) the predicted pixels of a first MV of the combined MV with the predicted pixels of a second MV of the combined MV. The predicted pixels of the combined MV are then compared to the source pixels to get a combined MV cost. In order to avoid recalculating prediction pixels for the first and second MV of the combined MV, the prediction pixels of each MV (e.g., the first MV and the second MV) are typically stored, in a buffer, after the prediction pixels are calculated during the sub-pixel-resolution MV search. Then when generating the combined predicted pixels, predicted pixels of the first MV and the second MV are loaded from the buffer and combined to generate the predicted pixels of the combined MV. A final MV (e.g., a single sub-pixel-resolution MV, a combined MV) with the lowest cost is selected to be encoded in the bitstream.

Because the buffer for storing predicted pixels has a fixed size, the number of MVs that can be considered (with their corresponding prediction pixels being stored in the buffer) cannot be increased. Aspects and embodiments of the present disclosure address these and other technological challenges of real-time video encoding in modern advanced codecs by providing for systems and techniques that perform efficient sub-pixel MV search. More specifically, determining a final MV for a block may be divided into three parts: full-pixel search (FPS), sub-pixel refine (SPR), and sub-pixel explicit (SPE). FPS may evaluate one or more integer MVs that approximate the source block. SPR may receive one or more integer MVs from FPS and/or one or more additional integer MVs. SPR may then evaluate one or more sub-pixel MVs corresponding to the received integer MVs using a first cost function without storing prediction pixels in a buffer. SPR may provide to SPE one or more (e.g., a top "N") sub-pixel MVs. SPE may evaluate each sub-pixel MV using a second (e.g., a more accurate) cost function. In some embodiments, costs of a block may be loaded from a buffer instead of calculated the cost by comparing predicted pixels to source pixels.

During evaluation of combined MVs. SPE may calculate costs, using the second cost function, by storing prediction pixels of only a single MV at a time. Because prediction pixels of only a single MV are buffered at a time, the number of MVs that can be evaluated is no longer limited by the size of the buffer. Although predicted pixels for a sub-pixel MV are calculated in SPR and recalculated in SPE, the improvements in quality of the encoded video outweigh the cost of the additional computation without significantly increasing the time required to encode a given video frame.

Advantages of the disclosed embodiments over the existing technology include increasing the number of MVs that can be considered without an increase in area of the hardware circuitry. By increasing the number of MVs that can be considered, an MV with a smaller error can be selected, resulting in a more efficient compression of the source pixels with no (or minimal) visually-perceptible distortions. Additionally, throughput of sub-pixel motion vector search hardware components is improved.

System Architecture

Figure 1A:
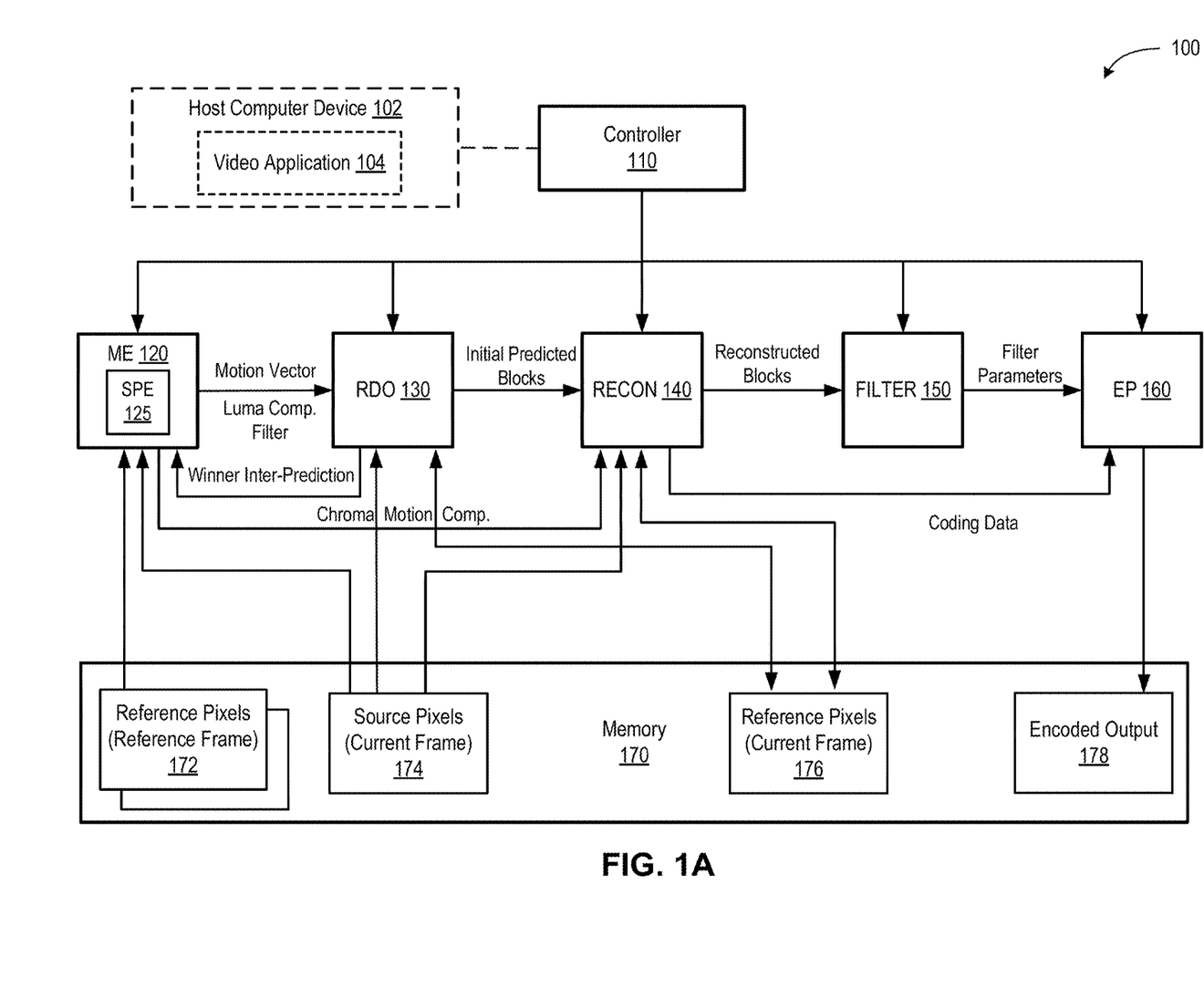
FIG. 1A is a schematic block diagram of an example codec accelerator system used for efficient encoding operations, in accordance with at least some embodiments.

FIG. 1A is a schematic block diagram of an example codec accelerator system 100 used for efficient encoding operations, in accordance with at least some embodiments. Codec accelerator system 100 may be a part of or in communication with a host computer device 102, which may be a desktop computer, a laptop computer, a smartphone, a tablet computer, a local server, a cloud server, a dedicated video processing server, a collection of multiple computing devices, a distributed computing system, a smart TV, an augmented reality device, or any other suitable computing device (or collection of computing devices) capable of performing the techniques described herein. Host computer device 102 may include one or more applications, including a video application 104, which may be any application capable of creating or managing video files. For example, video application 104 may be a video camera application, a video gaming application, a movie-making application, a video-streaming application, a social-networking application, or any other application that may create, render, download, receive, and/or process video files, including but not limited to high-definition video files.

As depicted in FIG. 1A, codec accelerator system 100 may include a controller 110 communicatively coupled to a number of components or functional groups, such as a motion estimation group (ME) 120, a rate distortion optimization group (RDO) 130, a reconstruction group (RECON) 140, a filtering group (FILTER) 150, and an entropy processing group (EP) 160. Each functional group may be implemented via one or more electronic circuits. In some embodiments, any functional group may be combined with any other functional group on the same silicon die. In some embodiments, all functional groups may be implemented (together with or separately from controller 110) on the same die. Any or all of the functional groups may be (or include) a number of configurable logic circuits. The logic circuits of any or all functional groups can be configured by controller 110, which may be an application-specific integrated circuit (ASIC), a finite state machine (FSM), a field-programmable gate array (FPGA), a central processing unit (CPU), a graphics processing unit (GPU), a parallel processing unit (PPU), or some other processing device, or a combination of the aforementioned processing devices. Various functional groups of codec accelerator system 100 may also be communicatively coupled to a memory 170, which may include one or more memory components, such as cache memory, dynamic randomly addressable memory ("DRAM"), static randomly addressable memory ("SRAM"), non-volatile memory (e.g., flash memory), or some other suitable data storage.

Controller 110 may receive instructions from a host computer device 102 identifying a video file to be encoded, e.g., by the file's storage location in memory 170. Responsive to receiving the instructions, controller 110 may initialize the functional groups of codec accelerator system 100. Codec accelerator system 100 may process various frames in the video file sequentially. Each frame may be processed using one or more reference frames. Memory 170 may maintain a status register (not explicitly depicted) indicating frames of the video file that are designated as reference frames. Controller 110 or ME 120 may manage (e.g., access and control) the status register and, from time to time, change designation of reference frames, removing reference designations from some frames and designating other frames as reference frames. In some embodiments, during processing of a current frame, ME 120 may access (receive from memory 170) reference pixels 172 of one or more reference frames, which may include previous frame(s) and/or subsequent frame(s). ME 120 may further access source pixels 174 of the current frame and perform segmentation of the current frame into blocks of various sizes according to the codec standard.

Figure 1B:
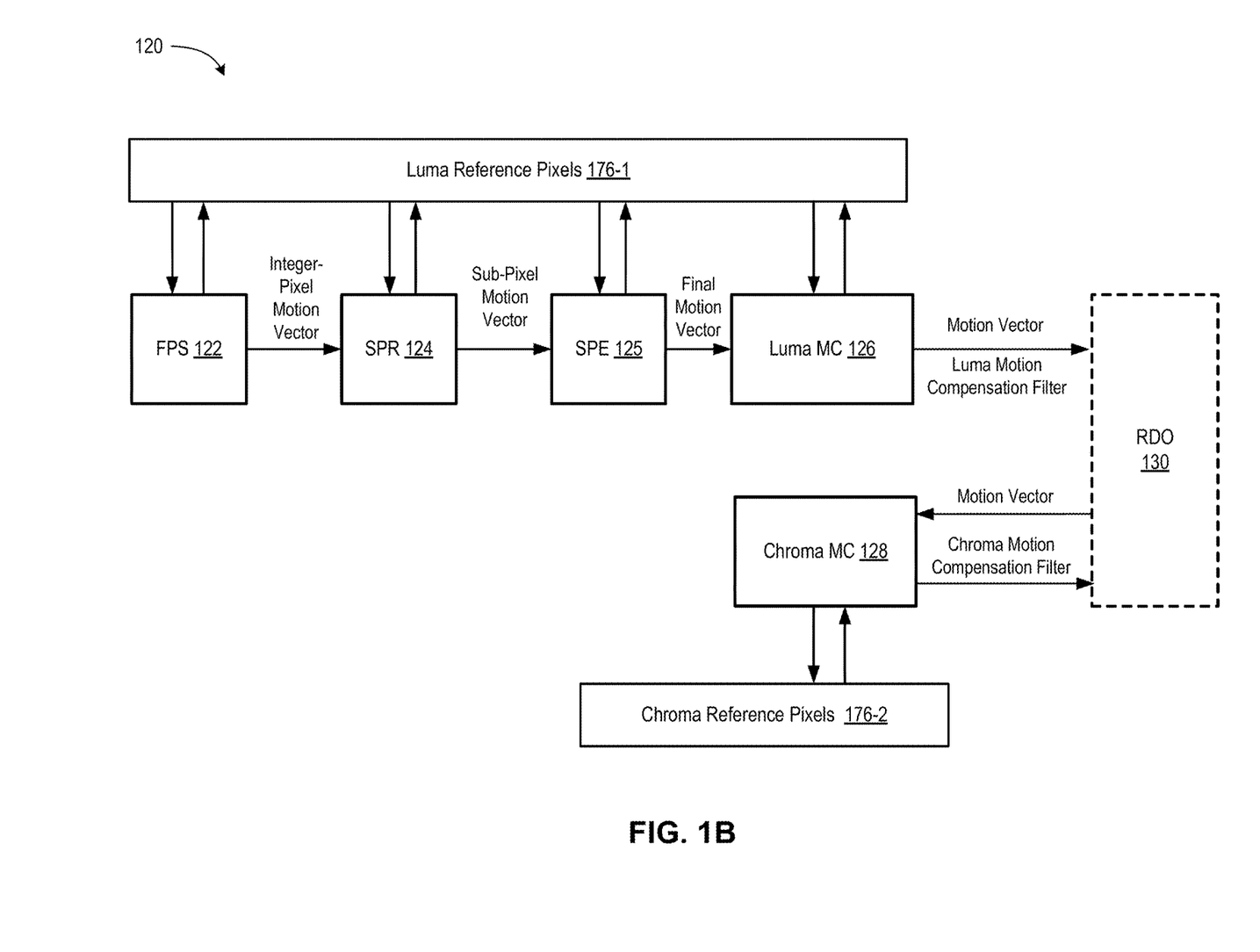
FIG. 1B is a schematic block diagram of a motion estimation functional group of the example codec accelerator system of FIG. 1A, in accordance with at least some embodiments.

FIG. 1B is a schematic block diagram of a motion estimation functional group (ME 120) of example codec accelerator system 100 of FIG. 1A, in accordance with at least some embodiments. As depicted in FIG. 1B, ME 120 may include a number of functional circuit blocks that may be implemented via separate circuits. Alternatively, any (or all) of the functional circuit blocks may be implemented on an integrated circuit. For each block of the current frame, ME 120 may identify a motion vector that specifies the motion transformation of the best candidate block (inter-frame predicted candidate) in one of the reference frames into a specific block in the current frame. In some embodiments, the motion transformation may be a translation specified by a two-dimensional vector (X, Y) in units of the number of pixels X and Y along the horizontal and vertical directions. The units may be integer or fractional. In some embodiments, the motion transformation may be an affine transformation that preserves lines and parallelism but does not necessarily preserve angles or distances. An affine transformation may be specified by a combination of a translation and a matrix transformation of the coordinates.

More specifically, a full-pixel search (FPS) functional circuit block 122 may identify a motion vector in terms of integer pixel values X and Y. A sub-pixel refine (SPR) functional circuit block 124 may then correct the values X and Y with a fractional pixel (e.g., sub-pixel) accuracy (e.g., ¼ pixel accuracy, ⅙ pixel accuracy, ⅛ pixel accuracy, and so on). A sub-pixel explicit (SPE) functional circuit block 125 may perform additional calculations to determine a final sub-pixel MV to be used in the encoding process. In some embodiments, FPS 122, SPR 124, and/or SPE 125 may determine the motion vector based on pixel brightness (luminance or, simply, luma) data of luma reference pixels 176-1 (e.g., stored in memory 170). The pixel color (chromaticity or, simply, chroma) data may be handled separately, as described below. The determined final sub-pixel motion vector (or, in some embodiments, an integer-pixel motion vector, if a lower resolution is sufficient) may be provided to a luma motion compensation (Luma MC) functional circuit block 126. Luma MC functional circuit block 126 may specify one or more motion compensation filters that are to be applied to the inter-frame prediction candidate block. Luma MC functional circuit block 126 may provide the determined motion vector and filter type information to RDO 130. Determining the motion vector based on luma (rather than both luma and chroma) may save an amount of computation in case the inter-frame prediction block is not selected by RDO 130.

Referring back to FIG. 1A, the information output by ME 120 (e.g., by Luma MC functional circuit block 126) may be received by RDO 130, which performs a dual function of i) performing initial intra-frame block prediction, and ii) comparing the initial intra-frame predictions with an inter-frame prediction generated by ME 120. RDO 130 may then select the best (intra- or inter-) block candidates.

In some instances, after comparison of the intra-frame with inter-frame predictions, RDO 130 may determine that an inter-frame prediction block is a winner. For example, the inter-frame prediction may have a smaller cost value characterizing a difference between the predicted block and a respective source block. In such instances, the selected inter-frame prediction winner may be returned to ME 120 for additional motion compensation filtering of the winner block's chroma pixel values. Referring again to FIG. 1B, motion vector may be provided to Chroma MC functional circuit block 128. Chroma MC functional circuit block 128 may access chroma reference pixels 176-2, identify a chroma motion compensation filter and communicate the identified filter back to RDO 130. In some embodiments, chroma data may have a reduced (compared to luma) resolution. For example, chroma values (e.g., red and blue chromaticity values, or red and green chromaticity values, or any other suitable chromaticity values) may be defined for each pair of pixels, for each 2×2 block of pixels, for each quad (4×4 block) of pixels, or according to any other suitable scheme. Motion compensation filters may be applied independently from luma filters (previously applied by ME 120) even when the winner inter-frame prediction block was determined on the basis of luma data alone. Referring back to FIG. 1A, in those instances when an inter-frame prediction block is not chosen, the motion vector may not be returned to ME 120 for chroma motion compensation as a winner intra-frame prediction block is provided to RECON 140.

Although, as described above, the motion vector determination may be based on just luma pixels, in other embodiments, motion vector may be determined based on both luma and chroma source pixel data, with luma error, red chroma error, and blue chroma error evaluated using the same or different cost functions. The relative weights assigned to luma and chroma errors may be determined empirically, by testing. Various cost functions may be used, including a sum of absolute transformed differences (SATD), a sum of squared differences (SSD), or other suitable cost functions. For example, selection of a luma motion compensation filter and/or a chroma motion compensation filter (or both) may be performed based on the SSD cost function that characterizes a difference between luma (and/or chroma) source pixel values of the current frame and pixel values of the chosen inter-frame prediction block.

RECON 140 receives predicted blocks from RDO 130 and ME 120. Some of the received predicted blocks may be inter-frame prediction blocks identified (and motion-compensated) by ME 120. Some of the received predicted blocks may be intra-frame predicted blocks. More than one intra-frame predicted block may be received for the same region of the frame. More specifically, an initial predicted block of the first size may be received together with one or more additional candidate blocks of other sizes. If intra-frame predicted blocks are received, RECON 140 may first identify a final predicted block (from the received initial predicted block and the additional predicted blocks). Subsequently, RECON 140 performs final block reconstruction, e.g., sequentially, starting from the top-left identified block (or according to some other order, if consistent with the codec standard). Specifically, RECON 140 computes a residual block by subtracting the final predicted block from the source block of the respective size and location. Then, RECON 140 identifies and applies a discrete transform to the residual block to obtain a transformed block and finally applies a quantization transform to the transformed block. RECON 140 may include a statistics-based quantization component (SBQ) 142, which performs context-aware quantization, according to the techniques of the instant disclosure. If the winner block is an inter-frame prediction block, RECON 140 may perform the same operations, except no final prediction block needs to be identified (as the inter-frame prediction block becomes the final prediction block). The coding data, which includes transformed (and quantized) residual blocks, together with the identification of the final predicted blocks, is communicated to EP 160 for generation of an encoded output 178. The identification of the final predicted block may include the size of the block and the final interpolation mode (in case of the intra-frame final predicted block) or the motion vector (in case of the inter-frame final predicted block).

Similarly, RECON 140 may identify other final predicted blocks and reconstruct these blocks. Boundary pixels of reconstructed blocks become reference pixels for reconstruction of the subsequent blocks and are stored in memory 170. To match the frame that a decoder is going to obtain from the encoded output 178, reference pixels used by RECON 140 may be the pixels of the reconstructed blocks (that would also be used by the decoder). More specifically, reconstructed blocks may be obtained from the transformed and quantized residual blocks by applying a reverse quantization transform and an inverse discrete transform to obtain reconstructed residual blocks, which are then added to the final predicted blocks. The process is continued until all final predicted blocks are similarly reconstructed.

The set of the reconstructed blocks of the frame may not yet be what is intended to be displayed (on the decoder side) to a viewer. Reconstructed blocks may additionally be processed by FILTER 150 group. FILTER 150 may select from a number of filters recognized by the codec standard being used and further determine various filter parameters to enhance visual quality of the reconstructed blocks, including removal of boundary and other artifacts created during block prediction and reconstruction. In some embodiments, available filters may include a deblocking filter that removes visible block boundaries between neighboring blocks. For example, the deblocking filter may identify the value of discontinuity of luma and/or chroma values across the boundary and spread this value over a number of pixels. The extent of the spread may be among the parameters determined by FILTER 150. Additionally, FILTER 150 may apply a constrained directional enhancement filter (CDEF) to remove ringing artifacts near depictions of sharp edges of various objects. More specifically, because the quantization transform irreversibly reduces or eliminates some short-wavelength harmonics (which are important for imaging of sharp edges), CDEF may compensate for the loss of such harmonics. CDEF may identify the most likely direction of edges, e.g., by identifying lines of a constant intensity and lines of the largest intensity gradients. In some embodiments, identification of such lines may be performed by identifying and minimizing SSD for directions that best match the directional patterns of the block. After identifying the direction of the block, CDEF may sharpen the depictions of the edges in the block by choosing the filter strength along the determined direction and across this direction. FILTER 150 may also apply a loop restoration (LR) filter to the block. LR filter further improves edge quality and noise reduction using a number of filters, such as a self-guided filter, a Wiener filter, or a combination of the self-guided filter and the Wiener filter. The identified filter parameters (for deblocking, CDEF, LR filters, or other suitable filters, or any combination thereof) are then communicated to EP 160 for inclusion in the encoded output 178.

In some embodiments, to expedite generation of the encoded output 178, FILTER 150 may perform filtering of some superblocks before all blocks inside a given superblock have been reconstructed by RECON 140. For example, if a superblock has a size of 64×64 pixels, FILTER 150 may determine filter parameters based on reconstructed regions of a reduced size, e.g., 48×48 pixels, 48×56 pixels, 48×54 pixels, 52×56 pixels, or some other regions of a reduced size. The regions of the reduced size may be located fully inside a corresponding superblock or may be touching at least one boundary of the superblock. The size of the reduced region may be dynamic, e.g., determined by the sizes of the reconstructed blocks inside the superblocks.

The output of FILTER 150 includes information that is sufficient for a decoder to reproduce the image frame (as well as multiple previous and subsequent frames), including identification of various inter-prediction and intra-prediction blocks, sizes, and interpolation modes for these blocks, identification of discrete transforms used to encode the blocks, identification of filters used to improve the visual quality of the blocks, and the like. The output of FILTER 150 may be provided to EP 160 for entropy encoding. Specifically, EP 160 may replace each fixed-length input symbol with a variable-length prefix-free output codeword. The length of each codeword may be approximately proportional to the negative logarithm of the probability of occurrence of the codeword so that the most common symbols are represented by the shortest codes. Various coding techniques may be used by EP 160, including Huffman coding and arithmetic coding. The encoded output 178 may be stored in memory 170 and/or livestreamed over the Internet or any other suitable network, including a local area network, a wide area network, a personal area network, a public network, a private network, and the like.

In some embodiments, functionality described above is performed by circuit blocks. In another embodiment, some of the functionality (of one or more circuit groups 120-160) may be implemented in one or more software or firmware modules executed by a processing device, e.g., a central processing unit (CPU), a graphics processing unit (GPU), a field-programmable gate array (FPGA), an application-specific integrated circuit (ASIC), or some other suitable logic device. For example, a first software/firmware module may implement functionality of FILTER 150 and/or a second software/firmware module may implement functionality of EP 160, whereas ME 120, RDO 130, and RECON 140 are implemented via dedicated functional circuit groups. In some embodiments, all of ME 120, RDO 130, RECON 140, FILTER 150, and EP 160 may be implemented as software/firmware modules.

Sub-Pixel Search

Figure 2:
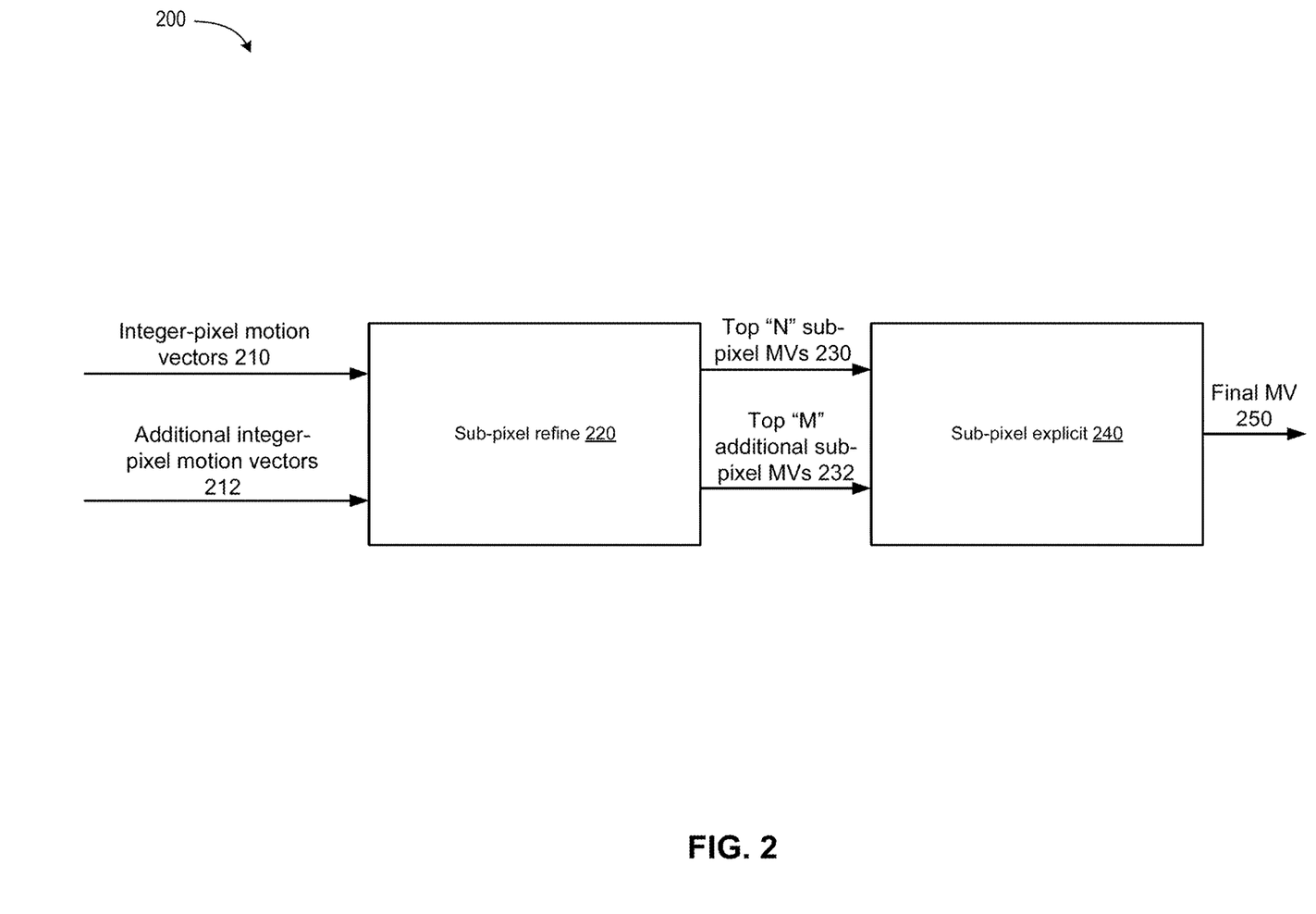
FIG. 2 is a schematic block diagram of sub-pixel motion vector search functional groups, in accordance with at least some embodiments.

FIG. 2 is a schematic block diagram of sub-pixel motion vector search functional groups 200, in accordance with at least some embodiments. Sub-pixel refine (SPR) 220 and sub-pixel explicit (SPE) 240 depicted in FIG. 2 may be SPR 124 and SPE 125, respectively, of example codec accelerator system 100 of FIG. 1B. SPR 220 may receive one or more integer-pixel MVs 210 (e.g., from FPS 122). In some embodiments, integer-pixel MVs 210 may include the top "N" (e.g., 2, 3, 5) best integer-resolution MVs in a neighborhood around the current block being evaluated. SPR 220 may also receive one or more additional integer-pixel MVs 212 which may not be based on the current block being evaluated. Additional integer-pixel MVs 212 may include a predicted MV, the zero MV, a global MV, an MV of a neighbor PU, or an external hint MV. SPR 220 may calculate a cost of each received MV at a sub-pixel resolution. For example, SPR 220 may perform a half-pixel search around each integer MV by calculating a cost for one or more (e.g., 8) half-pixel locations around the integer MV. Integer-resolution pixels around the integer MV may be interpolated (e.g., bilinear interpolation) to obtain half-pixel-resolution pixel values and/or quarter-pixel-resolution pixel values.

In some embodiments, SPR 220 may perform (instead of or in addition to the half-pixel search) a quarter-pixel search around one or more integer MVs and/or half-pixel MVs. A cost for each sub-pixel MV may be calculated by 1) generating prediction pixels for the MV and 2) comparing the generated prediction pixels to corresponding source pixels using a cost function. To generate prediction pixels for the MV, a block of pixels of a corresponding reconstructed reference frame may be transformed based on the MV. The prediction pixels may be compared to corresponding source pixels using a first cost function. The first cost may include a distortion cost and an encoding cost. The distortion cost may be based on a 4×4 SATD cost function. The encoding cost may be based on a difference between a predicted MV for the image frame and the current MV. SPR 220 may not store prediction pixels for any MV in a buffer during evaluation of the received integer-pixel MVs.

After evaluating one or more sub-pixel MVs around the one or more integer-pixel MVs, a top N MVs (e.g., top N sub-pixel MVs 230) may be selected based on the associated cost for each MV. For example, the top 3 sub-pixel MVs with the lowest costs may be selected. A top M MVs of the additional integer-pixel MVs (e.g., top M additional sub-pixel MVs 232) may also be selected. Top N sub-pixel MVs 230 and/or top M additional sub-pixel MVs 232 may be provided to SPE 240. In some embodiments, N and M are the same. In some embodiments, N may be greater (or less) than M.

SPE 240 may calculate a second cost for each received sub-pixel MV (e.g., top N sub-pixel MVs 230 and/or top M additional sub-pixel MVs 232). SPE 240 may recalculate prediction pixels for a sub-pixel MV and may compare the prediction pixels to the source pixels of the current block being evaluated. Based on the comparison, SPE 240 may calculate a second cost of the sux-pixel MV by using a second cost function. In some embodiments, the second cost includes a distortion cost and an encoding cost. The distortion cost may be based on an 8×8 SATD cost function. The encoding cost may be based on a difference between a predicted MV for the block and the current MV.

SPE 240 may also calculate a cost of one or more combined MVs. Each combined MV may be based on more than one (e.g., 2) MVs and may have corresponding prediction pixels based on an average of the prediction pixel values of the more than one MVs. In some embodiments, each sub-pixel MV is combined with every other sub-pixel MV. For example, a combined MV may be based on a first MV and a second MV. To calculate a cost of the combined MV, prediction pixels of the combined MV may be compared to source pixels of the current block. Prediction pixels of the combined MV may be generated by averaging the prediction pixels of the first MV of the combined MV with the prediction pixels of the second MV of the combined MV. The cost may then be calculated based on the comparison of the predicted pixels to the source pixels using the second cost function (e.g., 8×8 SATD).

To increase efficiency of calculating costs of combined MVs, the prediction pixels of an MV may be stored in a buffer. For example, if SPE 240 received five sub-pixel MVs, the prediction pixels of the first sub-pixel MV may be generated and stored in the buffer during the calculation of the cost of that MV. A cost of a combined MV based on the first sub-pixel MV and the second sub-pixel MV may then be calculated by generating prediction pixels for the second sub-pixel MV and comparing them to the stored prediction pixels of the first sub-pixel MV. A cost of a combined MV based on the first sub-pixel MV and the third sub-pixel MV may be calculated in a similar manner, and the process may continue. Thus, the buffer may only need to store the prediction pixels of a single MV at a time, reducing the size and circuitry area needed for the buffer. Final MV 250 with the lowest cost may be selected by SPE 240 by comparing the second costs associated with each sub-pixel MV calculated by SPE 240 and the calculated costs of the combined MVs. In some embodiments, SPE 240 may output more than one MV (e.g., top N best MVs) based on the MVs with the lowest costs.

In some embodiments, during calculation of the distortion cost in the first cost function and/or the second cost function, the DC component of the Hadamard-transformed difference may be multiplied by a scalar between 0 and 1 (e.g., 0.25, 0.5, 0.75) to achieve a better output quality.

Figure 3:
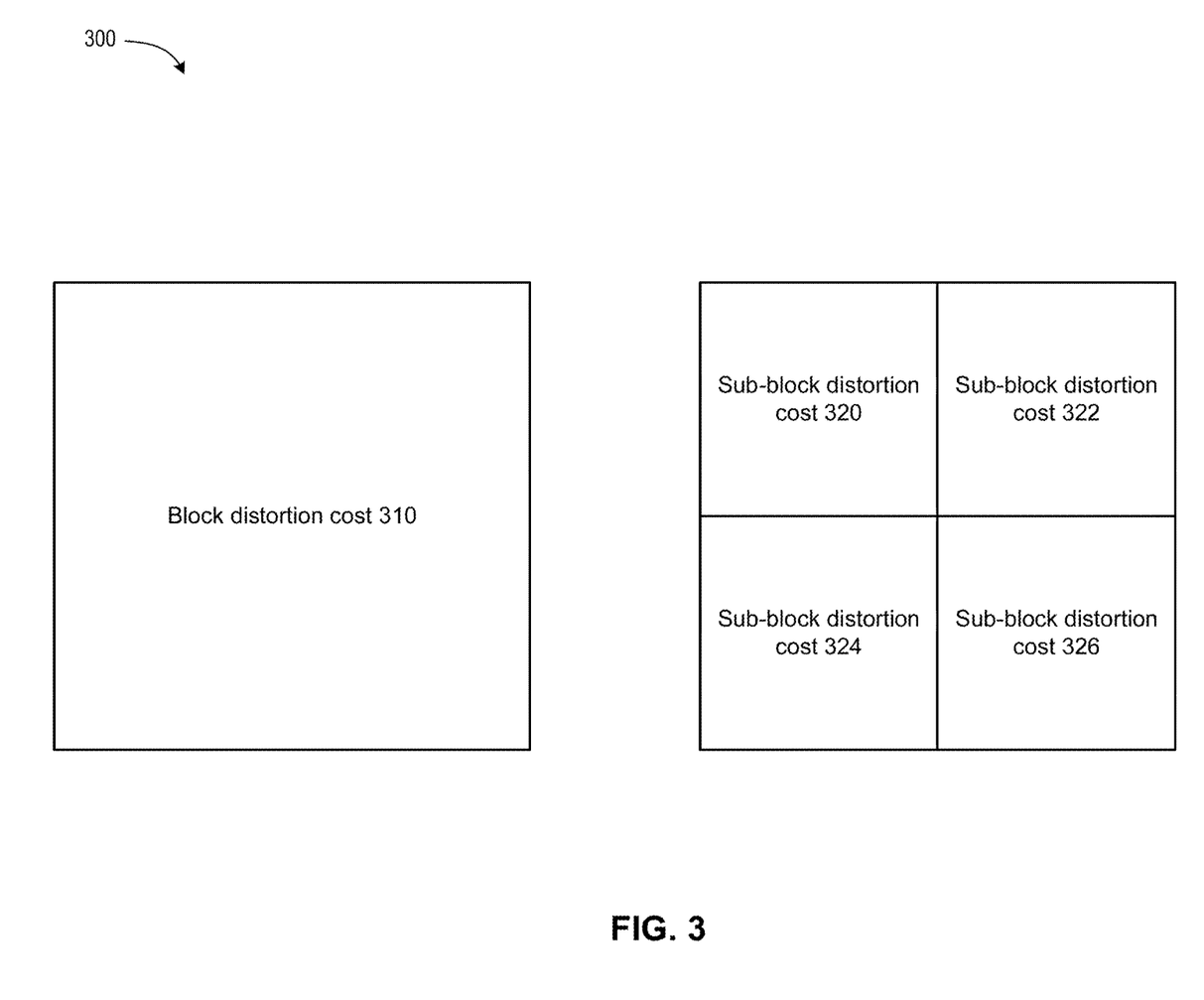
FIG. 3 is a block diagram of calculating a block cost during sub-pixel motion vector search, in accordance with at least some embodiments.

FIG. 3 is a block diagram 300 of calculating a block cost during sub-pixel motion vector search, in accordance with at least some embodiments. A block cost may include a combination of a distortion cost and an MV cost. The MV cost of a block may be based on a cost of encoding the MV into the bitstream (e.g., encoding cost). To calculate the distortion cost of an MV for a block, prediction pixels for the block may be calculated. Each 4×4 (or 8×8) grid of the prediction pixels may be compared to a corresponding 4×4 (or 8×8) grid of source pixels, and a SATD cost may be calculated for the grid.

The distortion cost of an MV of a first block (e.g., a block of 16×16 pixels) may be calculated by combining the distortion costs of one or more sub-blocks (e.g., 4 blocks of 8×8 pixels). For example, as shown in FIG. 3, block distortion cost 310 can be calculated by combining sub-block distortion costs 320-326. The MV cost may be the same for a block and its sub-blocks (e.g., the blocks corresponding to block distortion cost 310 and sub-block distortion costs 320-326).

During encoding of an image frame, blocks of a first size may be evaluated followed by blocks of a second (e.g., smaller) size. For example, a first block size may be 16×16 pixels. A second block size may be 8×8 pixels. Costs of MVs of a first block of the first size may be calculated as described above. During calculation of the costs of MVs of the first block of the first size, one or more costs of blocks of the second size are calculated. To improve efficiency and reduce the amount of cost calculations that are repeated, one or more cost calculations of the 4×4 (or 8×8) grids, or combinations of the 4×4 (or 8×8) grids, may be stored in a buffer. Then, during evaluation of a second block of the second block size, instead of (re) calculating prediction pixels for the 8×8 block and comparing them to source pixels, the distortion cost can be loaded from the buffer, as it was already calculated during evaluation of the 16×16 block. In some embodiments, costs calculated during SPR 220 may be used during SPE 240.

Figure 4:
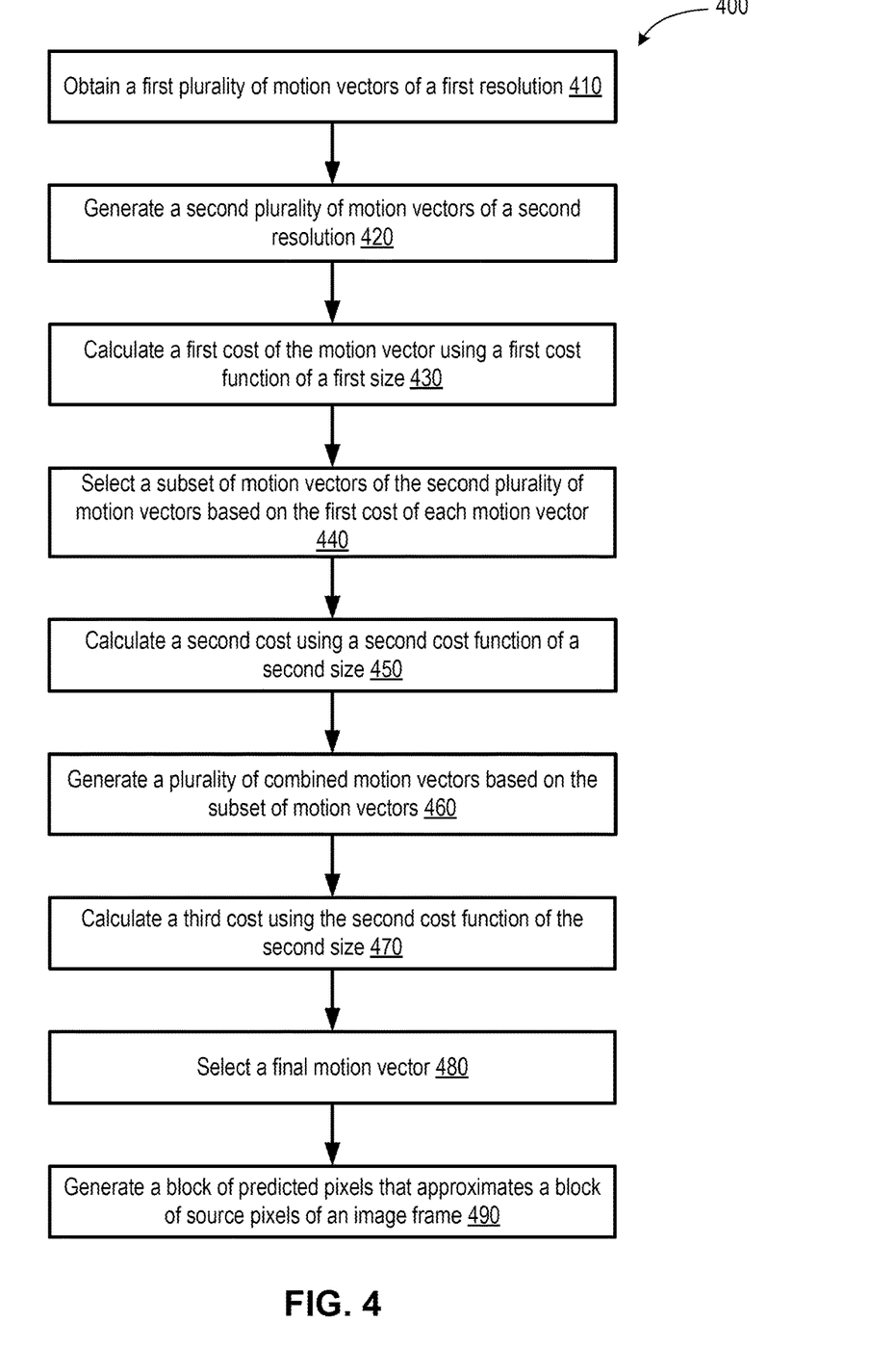
FIG. 4 is a flow diagram of an example method of determining an optimal motion vector for an inter-frame prediction, in accordance with at least some embodiments.
Figure 5:
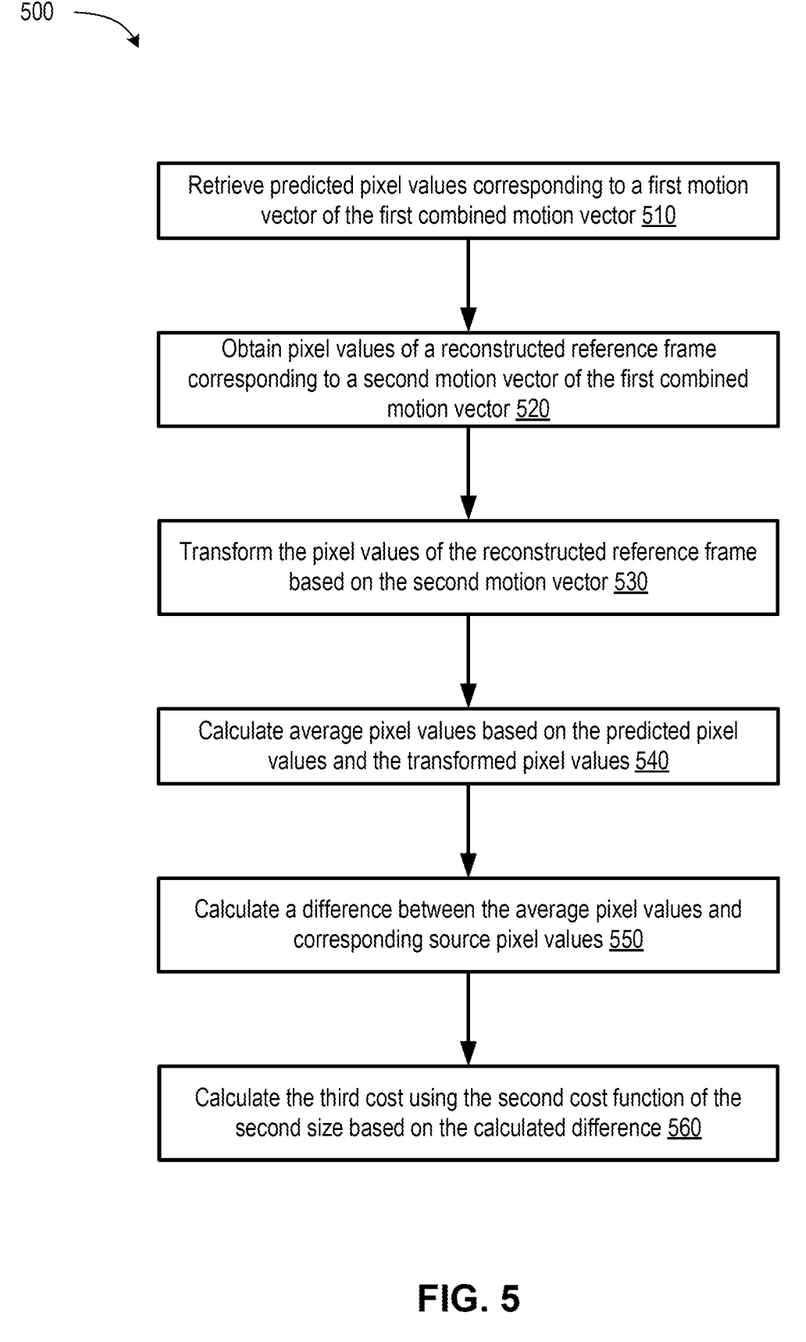
FIG. 5 is a flow diagram of an example method of determining an optimal motion vector for an inter-frame prediction, in accordance with at least some embodiments.

FIG. 4 and FIG. 5 are flow diagrams of example methods 400 and 500 of determining an optimal motion vector for an inter-frame prediction, in accordance with at least some embodiments. In some embodiments, methods 400 and 500 may be performed by example codec accelerator system 100 of FIG. 1A. In some embodiments, methods 400 and 500 may be performed by one or more circuits that may communicate with one or more memory devices. In some embodiments, at least some operations of methods 400 and 500 may be performed by multiple (e.g., parallel) hardware threads, each thread executing one or more individual functions, routines, subroutines, or operations of the methods. In some embodiments, processing threads implementing methods 400 and 500 may be synchronized (e.g., using semaphores, critical sections, and/or other thread synchronization mechanisms). Alternatively, hardware threads implementing methods 400 and 500 may be executed asynchronously with respect to each other. Various operations of methods 400 and 500 may be performed in a different order compared with the order shown in FIG. 4 and FIG. 5. Some operations of methods 400 and 500 may be performed concurrently with other operations. In some embodiments, one or more operations shown in FIG. 4 and FIG. 5 may not be performed.

FIG. 4 is a flow diagram of an example method 400 of determining an optimal motion vector, in accordance with at least some embodiments. Method 400 may be performed to encode a video file in AV1 codec format, VP9 codec format, H.264 codec format, H.265 codec format, or any other suitable video codec format. At block 410, the one or more circuits performing method 400 may obtain a first plurality of motion vectors of first resolution. In some embodiments, the first resolution is an integer-pixel resolution. In some embodiments, the first resolution is a half-pixel resolution. In some embodiments, at least one of the motion vectors of the first plurality of motion vectors may be obtained from FPS 122 of FIG. 1B. At block 420, the one or more circuits may generate a second plurality of motion vectors of a second resolution. The second resolution may be a half-pixel resolution, a quarter-pixel resolution, or any other suitable resolution.

At block 430, the one or more circuits may calculate, for each motion vector of the second plurality of motion vectors, a first cost of the motion vector using a first cost function of a first size. The first cost may include a distortion cost and an encoding cost. The first cost function of the first size may be a 4×4 sum of absolute Hadamard-transformed difference (SATD) function. At block 440, the one or more circuits may select a subset of motion vectors of the second plurality of motion vectors based on the first cost of each motion vector. For example, the motion vectors of the second plurality of motion vectors may be sorted (e.g., from lowest to highest) based on their associated costs. The subset of motion vectors may include the top N motion vectors of the second plurality of motion vectors with the lowest costs.

At block 450, the one or more circuits may calculate, for each motion vector of the subset of motion vectors, a second cost using a second cost function of a second size. The second cost may include a distortion cost and an encoding cost. The second cost function of the second size may be an 8×8 sum of absolute Hadamard-transformed difference (SATD) function. At block 460, the one or more circuits may generate a plurality of combined motion vectors based on the subset of motion vectors. A combined motion vector may include a first motion vector and a second motion vector. In some embodiments, a combined motion vector is generated using each motion vector of the subset of motion vectors.

At block 470, the one or more circuits may calculate, for each motion vector of the plurality of combined motion vector, a third cost using the second cost function of the second size. At block 480, the one or more circuits may select a final motion vector. The final motion vector may be selected based on the cost of each motion vector of the subset of motion vectors and the cost of each motion vector of the plurality of combined motion vectors. At block 480, the one or more circuits may generate, based on the selected final motion vector, a block of predicted pixels that approximates a block of source pixels of an image frame. The final motion vector (or a representation of the final motion vector) may be encoded in a bitstream during compression of the image frame.

FIG. 5 is a flow diagram of an example method 500 of determining an optimal motion vector for an inter-frame prediction, in accordance with at least some embodiments. In some embodiments, method 500 may be performed as part of block 470 of method 400. Method 500 may be performed separately (e.g., in parallel) for various combined motion vectors. More specifically, at block 510, one or more circuits performing method 500 may retrieve, from a buffer, predicted pixel values corresponding to a first motion vector of a first combined motion vector. At block 520, the one or more circuits may obtain pixel values of a reconstructed reference frame corresponding to a second motion vector of the first combined motion vector. At block 530, the one or more circuits may transform the pixel values of the corresponding reconstructed reference frame based on the second motion vector. The one or more circuits may, at block 540, calculate average pixel values based on the predicted pixel values and the transformed pixel values. At block 550, the one or more circuits may calculate a difference between the average pixel values and corresponding source pixel values. At block 560, the one or more circuits may calculate the third cost using the second cost function of the second size based on the calculated difference.

Images and videos generated applying one or more of the techniques disclosed herein may be displayed on a monitor or other display device. In some embodiments, the display device may be coupled directly to the system or processor generating or rendering the images or videos. In other embodiments, the display device may be coupled indirectly to the system or processor, such as via a network. Examples of such networks include the Internet, mobile telecommunications networks, a WIFI network, as well as any other wired and/or wireless networking system. When the display device is indirectly coupled, the images or videos generated by the system or processor may be streamed over the network to the display device. Such streaming allows, for example, video games or other applications, which render images or videos, to be executed on a server or in a data center and the rendered images and videos to be transmitted and displayed on one or more user devices (such as a computer, video game console, smartphone, other mobile devices, etc.) that are physically separate from the server or data center. Hence, the techniques disclosed herein can be applied to enhance the images or videos that are streamed and to enhance services that stream images and videos, such as NVIDIA Geforce Now (GFN), Google Stadia, and the like.

Furthermore, images and videos generated applying one or more of the techniques disclosed herein may be used to train, test, or certify deep neural networks (DNNs) used to recognize objects and environments in the real world. Such images and videos may include scenes of roadways, factories, buildings, urban settings, rural settings, humans, animals, and any other physical object or real-world setting. Such images and videos may be used to train, test, or certify DNNs that are employed in machines or robots to manipulate, handle, or modify physical objects in the real world. Furthermore, such images and videos may be used to train, test, or certify DNNs that are employed in autonomous vehicles to navigate and move the vehicles through the real world. Additionally, images and videos generated applying one or more of the techniques disclosed herein may be used to convey information to users of such machines, robots, and vehicles.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in an illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but it can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium stores instructions and a main central processing unit ("CPU") executes some of the instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to same the extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or an interprocess communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on the circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A method comprising:
   obtaining a first plurality of motion vectors of a first resolution;
   generating a second plurality of motion vectors of a second resolution based on the first plurality of motion vectors of the first resolution;
   calculating, for each motion vector of the second plurality of motion vectors, a first cost of the motion vector using a first cost function of a first size;
   selecting a subset of motion vectors of the second plurality of motion vectors based on the first cost of each motion vector;
   calculating, for each motion vector of the subset of motion vectors, a second cost using a second cost function of a second size;
   generating a plurality of combined motion vectors based on the subset of motion vectors;
   calculating, for each motion vector of the plurality of combined motion vectors, a third cost using the second cost function of the second size;
   selecting, based on the cost of each motion vector of the subset of motion vectors and the cost of each motion vector of the plurality of combined motion vectors, a final motion vector; and
   generating, based on the final motion vector, a block of predicted pixels that approximates a block of source pixels of an image frame.

2. The method of claim 1, wherein calculating the first cost of the motion vector comprises, for at least a first motion vector of the second plurality of motion vectors:

obtaining pixel values of a corresponding reconstructed reference frame;
transforming the pixel values based on the first motion vector;
calculating a difference between the transformed pixel values and corresponding source pixel values; and
calculating the first cost using the first cost function of the first size based on the calculated difference.

3. The method of claim 1, wherein calculating the first cost of the motion vector comprises, for at least a first motion vector of the second plurality of motion vectors, retrieving, from a buffer, the first cost of the first motion vector of the second plurality of motion vectors.

4. The method of claim 1, wherein calculating the third cost comprises, for at least a first combined motion vector of the plurality of combined motion vectors:
retrieving, from a buffer, predicted pixel values corresponding to a first motion vector of the first combined motion vector;
obtaining pixel values of a reconstructed reference frame corresponding to a second motion vector of the first combined motion vector;
transforming the pixel values of the reconstructed reference frame based on the second motion vector;
calculating average pixel values based on the predicted pixel values and the transformed pixel values;
calculating a difference between the average pixel values and corresponding source pixel values; and
calculating the third cost using the second cost function of the second size based on the calculated difference.

5. The method of claim 1, wherein the first resolution is an integer-pixel resolution and wherein the second resolution comprises at least one of a half-pixel resolution or a quarter-pixel resolution.

6. The method of claim 1, wherein the first cost function of the first size is a 4×4 sum of absolute Hadamard-transformed difference function.

7. The method of claim 1, wherein the second cost function of the second size is an 8×8 sum of absolute Hadamard-transformed difference function.

8. A system comprising:
a memory device; and
one or more circuit groups communicatively coupled to the memory device, the one or more circuit groups to:
obtain a first plurality of motion vectors of a first resolution;
generate a second plurality of motion vectors of a second resolution based on the first plurality of motion vectors of the first resolution;
calculate, for each motion vector of the second plurality of motion vectors, a first cost of the motion vector using a first cost function of a first size;
select a subset of motion vectors of the second plurality of motion vectors based on the first cost of each motion vector;
calculate, for each motion vector of the subset of motion vectors, a second cost using a second cost function of a second size;
generate a plurality of combined motion vectors based on the subset of motion vectors;
calculate, for each motion vector of the plurality of combined motion vectors, a third cost using the second cost function of the second size;
select, based on the cost of each motion vector of the subset of motion vectors and the cost of each motion vector of the plurality of combined motion vectors, a final motion vector; and generate, based on the final motion vector, a block of predicted pixels that approximates a block of source pixels of an image frame.

9. The system of claim 8, wherein to calculate the first cost of the motion vector, the one or more circuit groups are further to, for at least a first motion vector of the second plurality of motion vectors:
obtain pixel values of a corresponding reconstructed reference frame;
transform the pixel values based on the first motion vector;
calculate a difference between the transformed pixel values and corresponding source pixel values; and
calculate the first cost using the first cost function of the first size based on the calculated difference.

10. The system of claim 8, wherein to calculate the first cost of the motion vector, the one or more circuit groups are further to, for at least a first motion vector of the second plurality of motion vectors, retrieve, from a buffer, the first cost of the first motion vector of the second plurality of motion vectors.

11. The system of claim 8, wherein to calculate the third cost, the one or more circuit groups are further to, for at least a first combined motion vector of the plurality of combined motion vectors:
retrieve, from a buffer, predicted pixel values corresponding to a first motion vector of the first combined motion vector;
obtain pixel values of a reconstructed reference frame corresponding to a second motion vector of the first combined motion vector;
transform the pixel values of the reconstructed reference frame based on the second motion vector;
calculate average pixel values based on the predicted pixel values and the transformed pixel values;
calculate a difference between the average pixel values and corresponding source pixel values; and
calculate the third cost using the second cost function of the second size based on the calculated difference.

12. The system of claim 8, wherein the first resolution is an integer-pixel resolution and wherein the second resolution comprises at least one of a half-pixel resolution or a quarter-pixel resolution.

13. The system of claim 8, wherein the first cost function of the first size is a 4×4 sum of absolute Hadamard-transformed difference function.

14. The system of claim 8, wherein the second cost function of the second size is an 8×8 sum of absolute Hadamard-transformed difference function.

15. A system comprising:
a memory device; and
one or more circuit groups communicatively coupled to the memory device, the one or more circuit groups comprising:
a first circuit group to:
obtain a first plurality of motion vectors of a first resolution;
generate a second plurality of motion vectors of a second resolution based on the first plurality of motion vectors of the first resolution;
calculate, for each motion vector of the second plurality of motion vectors, a first cost of the motion vector using a first cost function of a first size; and
select a subset of motion vectors of the second plurality of motion vectors based on the first cost of each motion vector; and a second circuit group communicatively coupled to the first circuit group, the second circuit group to:
- calculate, for each motion vector of the subset of motion vectors, a second cost using a second cost function of a second size;
- generate a plurality of combined motion vectors based on the subset of motion vectors;
- calculate, for each motion vector of the plurality of combined motion vectors, a third cost using the second cost function of the second size;
- select, based on the cost of each motion vector of the subset of motion vectors and the cost of each motion vector of the plurality of combined motion vectors, a final motion vector; and
- generate, based on the final motion vector, a block of predicted pixels that approximates a block of source pixels of an image frame.

16. The system of claim 15, wherein to calculate the first cost of the motion vector, the first circuit group is further to, for at least a first motion vector of the second plurality of motion vectors:
- obtain pixel values of a corresponding reconstructed reference frame;
- transform the pixel values based on the first motion vector;
- calculate a difference between the transformed pixel values and corresponding source pixel values; and
- calculate the first cost using the first cost function of the first size based on the calculated difference.

17. The system of claim 15, wherein to calculate the first cost of the motion vector, the first circuit group is further to, for at least a first motion vector of the second plurality of motion vectors, retrieve, from a buffer, the first cost of the first motion vector of the second plurality of motion vectors.

18. The system of claim 15, wherein to calculate the third cost, the second circuit group is further to, for at least a first combined motion vector of the plurality of combined motion vectors:
- retrieve, from a buffer, predicted pixel values corresponding to a first motion vector of the first combined motion vector;
- obtain pixel values of a reconstructed reference frame corresponding to a second motion vector of the first combined motion vector;
- transform the pixel values of the reconstructed reference frame based on the second motion vector;
- calculate average pixel values based on the predicted pixel values and the transformed pixel values;
- calculate a difference between the average pixel values and corresponding source pixel values; and
- calculate the third cost using the second cost function of the second size based on the calculated difference.

19. The system of claim 15, wherein the first resolution is an integer-pixel resolution and wherein the second resolution comprises at least one of a half-pixel resolution or a quarter-pixel resolution.

20. The system of claim 15, wherein the second cost function of the second size is an 8×8 sum of absolute Hadamard-transformed difference function.

* * * * *